July 5, 1938.  J. M. SUMMERS  2,123,068
COUPLING
Filed July 24, 1937
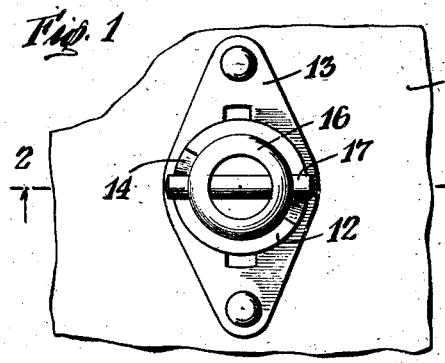
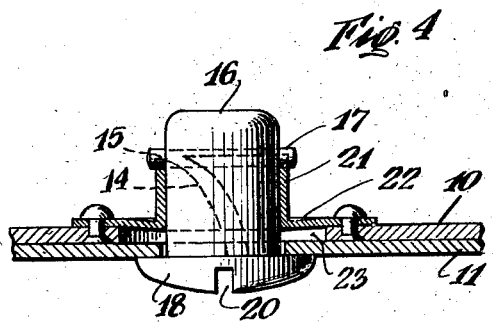
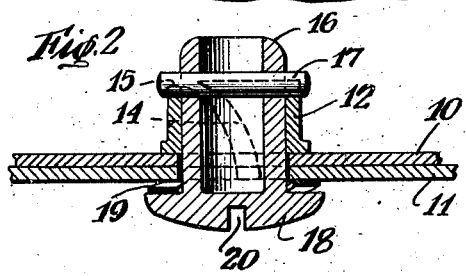
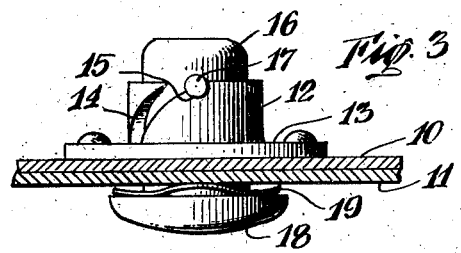
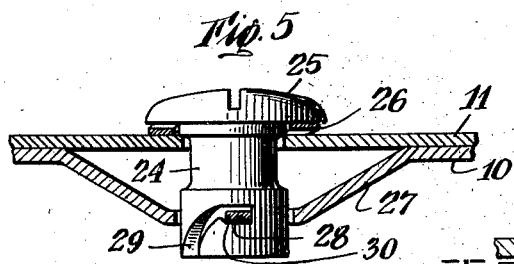
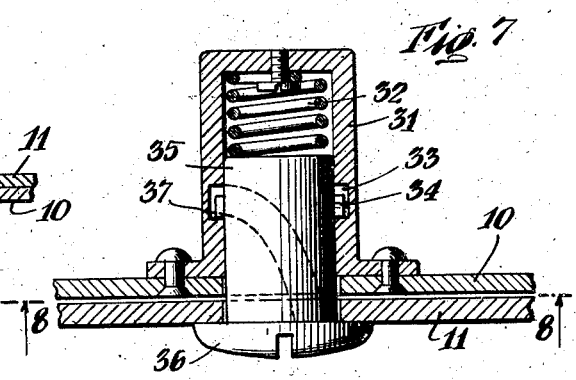
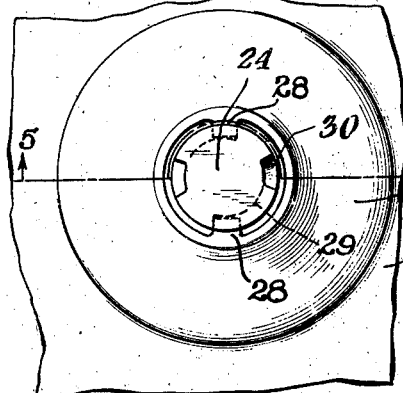
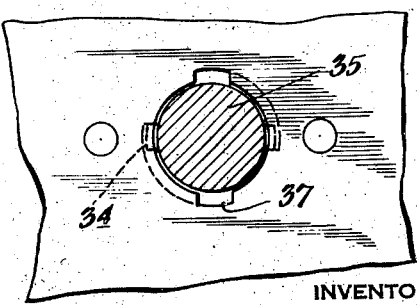
INVENTOR
J Mills Summers
BY
ATTORNEY Patented July 5, 1938

2,123,068

UNITED STATES PATENT OFFICE 2,123,068

COUPLING

J. Mills Summers, Englewood, N. J.

Application July 24, 1937, Serial No. 155,405

8 Claims. (Cl. 24—221)

This invention relates to a functionally and structurally improved coupling which may be employed in numerous different associations but which is primarily intended to couple layers of metal or similar material against movement with respect to each other, and/or to close or cover openings in one or more of such layers.

It is an object of the invention to furnish a unit of this character which may readily be manipulated to secure any number of material layers one to the other and against any probability of accidental displacement with respect to each other.

A further object of the invention is that of furnishing a coupling device, the parts of which will function to permit of a ready release of the layers from each other, it being understood that the coupling and uncoupling of the parts as specified in this and preceding paragraphs may be achieved, for example, merely by the employment of a simple tool such as a screw driver.

An additional object is that of providing a coupling device embodying relatively few parts, each individually simple and rugged in construction, such parts being capable of manufacture by more or less automatic machinery and when assembled operating over long periods of time with freedom from all difficulties.

With these and other objects in mind, reference is had to the attached sheet of drawings illustrating practical embodiments of the invention and in which:

Fig. 1 is a fragmentary face view of layers of material and showing the coupling in association therewith;

Fig. 2 is a transverse sectional view taken along the line 2—2 and in the direction of the arrows of Fig. 1;

Fig. 3 is a side view of the part as shown in Figs. 1 and 2;

Fig. 4 is a view similar to Fig. 2, but showing an alternative form of construction;

Fig. 5 is a sectional side view taken on lines 5—5 of Fig. 6 of the layers and illustrating a still further form which the coupling may take;

Fig. 6 is a bottom plan view of the unit as shown in Fig. 5;

Fig. 7 is a view similar to Fig. 2, but illustrating a still further form of coupling, and Fig. 8 is a bottom plan view partly in section, taken along the line 8—8 and in the direction of the arrows of Fig. 7.

By means of the present invention there is provided a coupling which, as afore brought out, permits a relatively inexperienced operator to unite, against the probability of any accidental detachment, a plurality of layers of material for the purpose of covering an opening in one of such layers or otherwise, but which coupling at the same time may, with equal facility be manipulated to allow of the parts being readily detached. The uses to which a structure such as this may be put are so numerous that it is impracticable to herewith schedule the same. Suffice it to say that any number of installations wherein the coupling will be useful will occur to anyone having knowledge of problems involving the connecting of material layers and especially layers of metal.

Thus, referring primarily to Figs. 1, 2, and 3, the numeral 10 indicates a material layer to which a second layer of material 11 is to be coupled. These layers are formed with aligned openings, preferably having the same diameter, and there extends from the inner face of layer 10 a flange or collar 12, defining the edge of the opening formed in such layer. While, of course, this collar might, if desired, be integral with layer 10, it is preferred, for convenience of manufacture, that the same form a part of a plate 13, secured to the face of layer 10 by rivets, welding, or otherwise. This collar is formed with a pair of spirally extending trackway portions, which are preferably continued through its body in the form of slots 14.

It is, of course, apparent that the length of travel of the slots 14 can be varied to suit any set of circumstances, and will, in part, be dependent on the length of travel desired for the stud 16 in each case.

Adjacent what might be termed the exit portions of the tracks or slots 14, the edge of the collar presents indentations 15. These slots and indentations should preferably be formed at diametrically opposite points in the collar, and it will of course, be understood that the entrance portions of these slots are conveniently continued through layer 10, as indicated especially in Fig. 2.

Rotatably mounted within collar 12 and of a length materially in excess of the height of such collar is a stud 16, from the side faces of which rod portions 17 extend. These portions may project beyond the face of the stud a distance in excess of the thickness of the material constituting the collar 12. Under these circumstances it is, of course, apparent that the notches or recesses in material layer 10 and in line with the entrance to slots 14 will be of a depth such that their base portions are separated a distance in excess of the over all length of rod ends 17. These ends 17 may, of course, be integral extensions of stud 16 and the latter might, if desired, be solid rather than hollow as illustrated. If, as shown, however, the rod 17 be a separate element, then it is to be understood that in being applied to stud 16 it shall be associated therewith in a manner such that any future relative movements of these parts is precluded.

Affixed to the outer end of stud 16 is a head portion 18, having a diameter materially in excess of the opening of layer 11 through which its shank extends. Interposed between this head portion and the outer face of layer 11 is a spring element 19 in the form of a resilient washer and which will, when in locked position, urge the head 18 inwardly, as viewed in Figs. 2 and 3. With this construction it is apparent that stud 16 including the rod end 17 is permanently attached to layer 11. This is also true of the resilient element or washer 19 which will at all times remain in position encircling the shank of said stud. The same will be true of collar 12 with respect to layer 10.

If now the end of stud 16 is introduced into the opening of layer 10 and the rod ends are brought to a position in line with the entrance of slot or trackway portions 14 (and the continuations thereof formed in layer 10), it will be obvious that by rotating stud 16 the rod or projecting portion 17 will be caused to traverse trackway portion 14, thus carrying layer 11 toward layer 10 until they are in intimate face to face contact. Thereupon, by compressing element 19, the projecting ends 17 may be caused to emerge from slot portions 14. During this movement of the parts, stud 16 will, of course, be turning as for example under the influence of a screw driver extending within the slot 20 of head 18, or the stud itself may present a portion which may be conveniently manipulated. Therefore, element 19 will be compressed to a major extent, and portions 17 will ride along the inner edge of collar 12 and enter the depressions or notches 15. Thereupon, by relieving the pressure resilient element 19, incident to the continued outward thrust which it exerts, will cause projections 17 to firmly engage these indentations, thus locking layers 10 and 11 against movement with respect to each other.

Obviously, a ready release of the parts may be effected by rotating stud 16 in the opposite direction whereby projections 17 will move out of the indentations and then by continuing to rotate said stud, the rod ends 17 or their equivalents will ride along the trackway portions 14, finally emerging through the opening in layer 10.

In the form of construction shown in Fig. 4, layers 10 and 11 have again been shown, but in this instance collar 21 has a base portion 22 which bridges a relatively enlarged opening 23 in layer 10. This base portion has inherently resilient characteristics and under these circumstances the resilient element 19 may be dispensed with.

It is apparent that with a construction such as this all parts cooperate in the manner afore described in connection with Figs. 1 to 3, excepting that this will distort the base portion 22, but will not damage the parts incident to the resilient nature of such base portion. Thus, the projections will be held in place within the indentations and layers 10 and 11 will be locked against movement. A release of these layers may obviously be effected by simply forcibly turning stud 16 in a reverse direction so that as the rod ends or projections 17 clear the entrance of slots 14, layers 10 and 11 may be completely separated.

In the form of construction shown in Figs. 5 and 6, a stud 24 is employed and which, similar to the forms described in Figs. 1 to 3, has a head 25 and is encircled by a resilient element such as a washer 26. This stud rotatably extends through an opening formed in layer 11, but layer 10 is in this instance extended rearwardly, as indicated at 27 and is furnished with an opening aligned with the opening of layer 11 and from the edge of which at diametrically opposite points projecting portions 28 extend. These portions may, of course, project entirely across the opening or, as shown, may terminate after they extend inwardly from the opening edge for a proper distance. If a cross bar is actually employed, then at least the base portion of stud 24 should be hollow. Otherwise it suffices that this base portion be formed with grooves 29 and detents 30 defining guiding tracks functionally corresponding to tracks 14 and detents 15.

As a consequence of this form of construction, it is apparent that with the parts in the position shown in Fig. 5, an operator, by rotating against head 25, may cause a projection on the part of stud 24 to bring the projections 28, or the cross bar, to a position at which it no longer rests within the detent portions 30. Thereupon, by simply turning the stud, it is apparent that the parts extending from the edges of the openings in plate 10, will traverse trackway portions 29 to a point at which layer 11 may be freely separated from layer 10. To couple the parts, a mere reversal of the foregoing operation is necessary.

Finally, referring to Figs. 7 and 8, it will be observed that layers 10 and 11 are again present. However, in lieu of collar portion 21, a tube 31 is affixed to the inner face of layer 10 and has a spring 32 extending outwardly from its base. In these views the trackway portions are provided by grooves 33 formed in the inner face of tube 31 and within which projections 34 ride. These grooves, as shown extend from the surface of layer 10 and are continued in the form of notches in the edges of the opening formed in such layer. A stud 35 is associated with layer 11 and has the heretofore described headed portion 36, or its equivalent. The projections 34 are either formed by the ends of a rod or may, as afore brought out, be integral with the stud. As indicated at 37, the inner ends of the grooves 33 terminate in indentations or offset portions within which projections 34 may rest after they have traversed grooves 33 to their inner limit.

In operation in this form of device stud 35 is introduced into tube 31 and rotated. This will cause projections 34 to traverse the grooves in an inward direction until the inner end of stud 35 engages spring 32, and compresses the same. Continued movement of the parts will cause projections 34 to finally ride within detents 37, at which point the stud may be released. Thus spring 32 will maintain the parts in locked position and with layers 10 and 11 in intimate contact, it being not necessary to employ a washer such as 19 or 26. A reverse movement of the parts will result in an obvious release of the layers.

Thus, it will be appreciated that a coupling is furnished which may readily be manipulated by an inexperienced operator and the parts of which may be economically manufactured under quantity production methods. Also, this coupling—when the parts are secured—prevents any accidental separation of those parts, but at the same time they may be readily released should this be desired. When so released, the several parts of the coupling will remain associated with the layers, thus preventing any loss of the several parts thereof. When put to certain uses it may be desirable completely to detach the several parts of the coupling and remove them from the respective layers which they serve to join with one another. In such contingency the stud and rod assembly should be so designed as completely to pass through the layer with which they are associated and be held in position solely by cooperation with the spiral trackway and detent of the collar member.

It is apparent that numerous changes in construction and rearrangements of the parts of the heretofore described coupling might be resorted to without departing from the scope of the invention as defined by the claims.

Having fully described the invention, what is claimed is:

1. A coupling of the character described comprising a stud member, an enlarged manipulating head associated with one end thereof, opposed abutments associated with the opposite end of said stud, a collar portion for cooperation with said stud and adapted to be carried by one layer of material to be coupled, said collar being formed with opposed spiral trackways for cooperation with said stud abutments, and a spring adapted for positioning between the manipulating head of said stud and the second layer of material to be coupled.

2. A coupling of the character described comprising a stud member, an enlarged manipulating head associated with one end thereof, opposed abutments associated with the opposite end of said stud, a collar portion for cooperation with said stud and adapted to be carried by one layer of material to be coupled, said collar being formed with opposed spiral trackways for cooperation with said stud abutments, detents formed at the end of said spiral trackways for receiving and holding said stud abutments, and a spring adapted for positioning between the manipulating head of said stud and the second layer of material to be coupled.

3. A coupling of the character described comprising a stud member, an enlarged manipulating head associated with one end thereof, opposed abutments associated with the opposite end of said stud, a collar portion for cooperation with said stud and adapted to be carried by one layer of material to be coupled, said collar being formed with opposed spiral trackways for cooperation with said stud abutments, detents formed at the end of said spiral trackways for receiving and holding said stud abutments, and spring pressed means for normally preventing the release of said stud abutments from said detents.

4. A coupling of the character described comprising a stud member, an enlarged manipulating head associated with one end thereof, opposed abutments associated with the opposite end of said stud, a collar portion for cooperation with said stud and adapted to be carried by one layer of material to be coupled, said collar being formed with opposed spiral trackways for cooperation with said stud abutments, and spring pressed means cooperating with the manipulating head of said stud and the second layer of material to be coupled to normally prevent the release of said stud abutments.

5. A coupling of the character described including, in combination, a stud, a manipulating head formed at one end thereof, opposed abutments adjacent the other end of said stud, a collar portion carried by one layer of material to be coupled, said collar portion provided with opposed spiral trackways for cooperation with said stud abutments, and resilient means cooperating with said stud and normally urging the latter out of association with said collar.

6. A coupling of the character described including, in combination, a stud, a manipulating head formed at one end thereof, opposed abutments adjacent the other end of said stud, a collar portion carried by one layer of material to be coupled, said collar portion provided with opposed spiral trackways for cooperation with said stud abutments, and resilient means cooperating with said manipulating head and the second layer of material to be coupled to normally oppose entrance of said stud within said collar member.

7. A coupling of the character described including, in combination, a stud, a manipulating head formed at one end thereof, opposed abutments adjacent the other end of said stud, a collar portion carried by one layer of material to be coupled, said collar portion provided with opposed spiral trackways for cooperation with said stud abutments, detents for retaining the stud abutments, and resilient means cooperating with said stud and normally urging the latter out of association with said collar.

8. A coupling of the character described including, in combination, a stud, a manipulating head formed at one end thereof, opposed abutments adjacent the other end of said stud, a collar portion carried by one layer of material to be coupled, said collar portion provided with opposed spiral trackways for cooperation with said stud abutments, detents for retaining the stud abutments, and resilient means cooperating with said manipulating head and the second layer of material to be coupled to normally oppose entrance of said stud within said collar member.

J. MILLS SUMMERS.